United States Patent [19]

Altenhofen

[11] Patent Number: 4,709,585

[45] Date of Patent: Dec. 1, 1987

[54] METHOD AND APPARATUS FOR MONITORING ENVIRONMENTAL EVAPOTRANSPIRATION

[76] Inventor: Jonathan M. Altenhofen, 4135 W. Horsetooth Rd., Ft. Collins, Colo. 80526

[21] Appl. No.: 874,142

[22] Filed: Jun. 13, 1986

[51] Int. Cl.$^4$ .................. G01N 19/10; G01F 23/02
[52] U.S. Cl. .................. 73/866.4; 73/335; 116/227; 116/321
[58] Field of Search .................. 73/73, 335, 336, 426, 73/427, 747, 326, 865.6, 866.4

[56] References Cited

U.S. PATENT DOCUMENTS

| | | | |
|---|---|---|---|
| 2,145,203 | 1/1939 | Walker et al. | 73/73 X |
| 3,150,524 | 9/1964 | Arens | 73/428 X |
| 3,446,076 | 5/1969 | Dieterich | 73/747 |
| 3,540,276 | 11/1970 | Lyden | 73/328 |
| 3,540,277 | 11/1970 | Roth et al. | 73/335 |
| 3,782,414 | 1/1974 | Holbrook | 73/427 X |
| 3,886,057 | 5/1975 | Bredeweg | 73/73 X |
| 3,898,872 | 8/1975 | Skaling et al. | 73/73 |
| 4,050,995 | 9/1977 | Bredeweg | 73/336.5 X |
| 4,348,206 | 9/1982 | Sandhu | 73/865.6 |
| 4,412,447 | 11/1983 | McMahan | 73/73 |

FOREIGN PATENT DOCUMENTS 58953  5/1913  Fed. Rep. of Germany .

OTHER PUBLICATIONS

Rosenberg, Microclimate: The Biological Environment, John Wiley & Sons, New York, Copyright 1974, p. 198 of 315.

Livingston, Atmometers of Porous Porcelain and Paper, Their Use in Physiological Ecology, Ecology, vol. XCI, No. 3, Jul. 1935.

Primary Examiner—Daniel M. Yasich
Attorney, Agent, or Firm—Schwartz, Jeffery, Schwaab, Mack, Blumenthal & Evans

[57] ABSTRACT

An atmometer for estimating a crop consumptive water evapotranspiration employs a green canvas colored material which is wrapped around a porcelain evaporating surface. The material simulates the albedo and diffusion resistance properties of the crop in order to provide an accurate estimation of evapotranspiration. A check valve at the bottom of the reservoir bottle helps prevent precipitation from adversely affecting the evapotranspiration estimate. Additionally, a sight glass is provided for indicating an amount of evaporated water.

19 Claims, 3 Drawing Figures

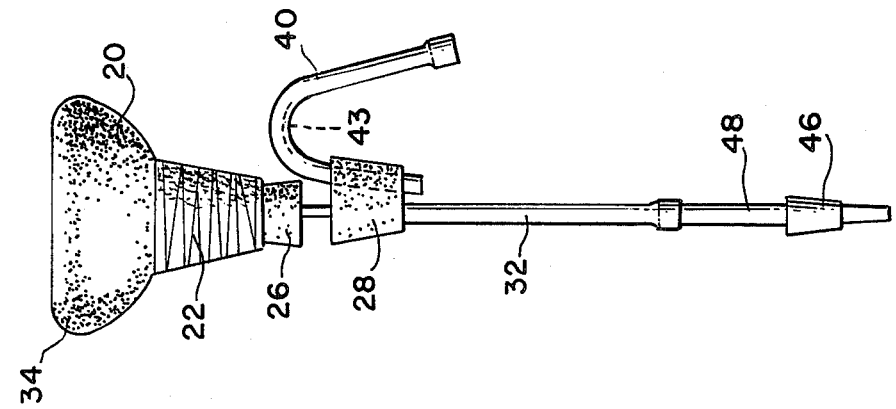
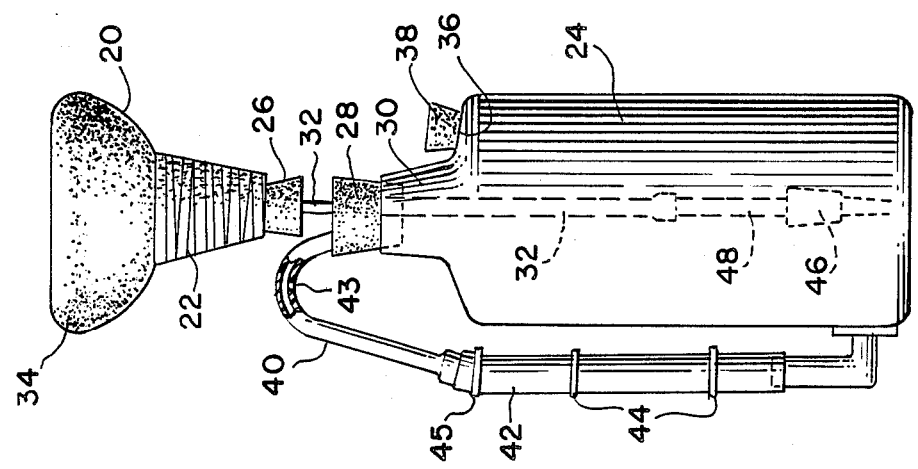
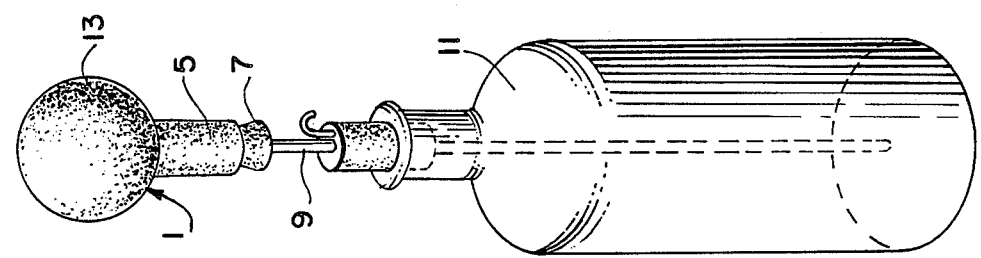

METHOD AND APPARATUS FOR MONITORING ENVIRONMENTAL EVAPOTRANSPIRATION

BACKGROUND OF THE INVENTION

1. Field of the Invention

The invention relates to instruments for measuring environmental evaporativity. Specifically, the invention relates to a device which models the diffusion resistance and albedo of field crops.

2. Related Art

A variety of atmometers or evaporimeters are known for measuring evaporativity of liquids. An atmometer is an instrument for measuring the evaporative capacity of air. The influence of the environmental complex on the vaporitization of water is known as evaporativity.

The simplest type of atmometer is an open pan. Water is placed in the pan, and a variety of methods are employed for determining the amount of water evaporation. Volume readings may be computed from depth measurements, or the pans may be weighed periodically in order to determine how much water has evaporated. Open pans have a number of disadvantages when used to estimate the crop water use or "evapotranspiration" of field crops. Pans are a free water surface which respond to heat absorption (advective energy) i.e., heat carried by the wind different than a crop surface. A free water surface does not exert any degree of resistance to the passage of water vapor into the air as a crop surface does. Also the large volume of water in a typical pan stores heat during the day resulting in evaporation at night which doesn't occur with a crop. Furthermore, wind tends to cause splashing out of the water, so that water is lost as a result of winds and not evaporation. In addition, the creation of ripples and waves increases the evaporating surface in an uncertain and variable manner.

A second type of atmometer is a wet paper or cloth atmometer. This form of atmometer employs a paper or cloth evaporating surface which is kept wet automatically by means of a distilled water supply from a reservoir. The evaporating surface is often in the shape of a disk or circle and can be made from thick filter paper or blotting paper. Evaporation occurs around the cylindrical edge of the circle as weel as from the two planar surfaces. One difficulty encountered by wet paper and cloth atmometers is that they are necessarily exposed unequally to wind from different directions. These atmometers are also free water surfaces offering no diffusion resistance to the water vapor evaporated.

A third type of atmometer is a porous porcelain atmometer. The porous porcelain atmometer comprises a porous porcelain piece having a hollow porous porcelain sphere or cylinder and a downwardly extending cylindrical neck. A rubber stopper seals the lower open end of the cylindrical neck. A tube extends from the cylindrical neck through the rubber stopper into a liquid reservoir. The porous porcelain piece is filled with distilled water and is connected to the water reservoir through the tube. Atmospheric pressure on the water in the reservoir keeps the tube and porcelain piece filled while evaporation takes place from the external porous porcelain surface. Small water-air menisci form over the external pore openings of the porcelain wall. This prevents air from entering into the porcelain structure. Evaporation takes place from the outer surface of the cylindrical neck and liquid water moves up from the reservoir and out through the porous walls at a rate adequate to keep the instrument filled and to maintain the microscopic menisci at the external pore openings of the porcelain structure.

One important application of atmometers is the estimation of water transpired by a green crop in a field. In measuring the crop consumptive water use or "evapotranspiration," it is important to consider a number of factors which will influence this parameter. Two key factors are the diffusion resistance of the crop and the albedo (amount of incident radiation which is reflected) of the crop. The known atmometers, being free water surface evaporimeters, do not account for these factors, and therefore, the estimated crop consumptive evapotranspiration is inaccurate.

The three above-mentioned atmometers are described in Livingston, "Atmometers of Porous Porcelain and Paper, Their Use in Physiological Ecology," *Ecology*, Vol. XVI, No. 3, July 1935.

U.S. Pat. No. 3,540,277 discloses an evaporimeter which raises the level of liquid to compensate for decreases in liquid level due to evaporation. While the actual amount of evaporated liquid can be fairly accurately measured by the disclosed apparatus, such measurements will not render extremely accurate estimates of crop evapotranspiration, as the diffusion resistance and albedo of crops have not been taken into account in the disclosed apparatus.

German Pat. No. 58953 discloses an evaporimeter having a valve at an upper end. Heat transmitted to the water in the evaporimeter expands and opens the upper valve to permit the evaporation of water. Here, the evaporation takes place from a free water surface, i.e., the surface is open to the atmosphere and does not account for diffusion resistance or albedo.

U.S. Pat. No. 3,898,872 and U.S. Pat. No. 4,412,477 also disclose apparatus which permit water movement or water evaporation from a "free" surface, which, as mentioned above, neglect diffusion resistance and albedo.

U.S. Pat. Nos. 3,886,057 and 4,050,995 disclose a method for determining water vapor transmission rate by mass spectrometer calculations of oxygen and hydrogen generated during electrolysis. Alternatively, the water vapor transmission rate can be determined by the electrical current needed to electrolyze the water vapor. All of the above-described devices do not account for diffusion resistance and albedo of crops. The need for a device which accounts for these parameters is expressed in Rosenberg, *Microclimate: The Biological Environment*, John Wiley and Sons, New York, Copyright 1974, page 198 of 315.

SUMMARY OF THE INVENTION

It is an object of the present invention to provide the simple and accurate method for estimating crop evapotranspiration. Specifically, it is an object of the present invention to provide a method of estimating crop evapotranspiration which accounts for diffusion resistance and albedo of crops.

It is a further object of the invention to provide an atmometer which provides a readily accessible indication of estimated crop evapotranspiration.

Yet another object of the present invention is to provide an atmometer which prevents precipitation from entering into the atmometer and introducing error into the estimation reading.

The above and other objects are achieved by providing an atmometer comprising a liquid evaporated surface and a covering means wrapped around the evaporating surface for modeling the diffusion resistance and albedo of a crop transpiring surface. A supply means provides a continuous liquid supply to the liquid evaporated surface.

An atmometer for estimating a crop consumptive water evapotranspiration employs a green canvas colored material which is wrapped around a procelain evaporating surface. The material simulates the albedo and diffusion resistance properties of the crop in order to provide an accurate estimation of evapotranspiration. A check valve at the bottom of the reservoir bottle helps prevent precipitation from adversely affecting the evapotranspiration estimate. Additionally, a sight glass is provided for indicating an amount of evaporated water.

BRIEF DESCRIPTION OF THE DRAWINGS

These and other objects, features, and advantages of the present invention will become more apparent from the following description when taken in connection with the accompanying drawings, wherein:

FIG. 1 shows a known procelain atmometer;

FIG. 2 shows an embodiment of an atmometer according to the present invention; and FIG. 3 shows a sub-assembly of the atmometer according to the present invention.

DETAILED DESCRIPTION OF THE PREFERRED EMBODIMENT

The following description illustrates the manner in which the principles of the invention are applied but are not to be construed as limiting the scope of the invention.

FIG. 1 illustrates a typical structure for a porous procelain atmometer. The atmometer comprises a porous porcelain piece 1 having a hollow porous porcelain sphere 13 with an external procelain surface and a downwardly extending cylindrical neck 5. A rubber stopper 7 seals the lower end of the cylindrical neck. A tube 9 extends from the cylindrical neck through the rubber stopper into a liquid reservoir 11. The porcelain piece 1 is filled with distilled water, and is connected to the water reservoir 11 through the tube 9. Atmospheric pressure on the water in the reservoir keeps the tube and cylindrical neck filled while evaporation takes place from the external porcelain surface. In measuring the crop consumptive water use or evapotranspiration, it is important to consider a number of factors which will influence this parameter. Two key factors are the diffusion resistance of the crop and the albedo (amount of incident radiation which is reflected) of the crop. The porous porcelain atmometer shown in FIG. 1 does not account for these factors, and therefore, the estimated crop consumptive evapotranspiration is inaccurate.

Referring to FIG. 2, a first embodiment of the invention is shown. A porous ceramic plate 20 having a cylindrical neck 22 is mounted on a reservoir bottle 24. In the embodiment shown, the ceramic plate is about 3 mm thick and has a high enough porosity to supply the maximum potential evaporative rate. A rubber stopper 26 is disposed in the lower end of the cylindrical neck 22 to form a fluid tight seal at the bottom of the cylindrical neck 22. A second rubber stopper 28 is disposed in the neck 30 of the reservoir bottle. The rubber stopper 28 forms a fluid tight seal with the neck 30 of the reservoir bottle. A tube 32 is connected between the rubber stoppers 26 and 28 and extends into the reservoir bottle. The tube is made of copper, aluminum, stainless steel or plastic.

A non-fading green canvas material 34 is wrapped around the top and rounded side of the porous ceramic plate. The non-fading green canvas material 34 simulates the albedo and diffusion resistance which effect crop surface evapotranspiration. The color is that of a healthy alfalfa field, and the tightness of weave of canvas gives the correct diffusion resistance.

A diffusion porometer was used to measure and compare the diffusion resistance of the non-fading green canvas material of the present invention and well-watered alfalfa. In one experimental test, an atmometer in accordance with the present invention was set up in an alfalfa field at solar noon on a clear day. The diffusion resistance of the atmometer according to the present invention ranged from 1.0 to 3.0 s/cm (seconds/centimeter, i.e., the number of seconds it takes water vapor to move or diffuse one centimeter). The alfalfa stomatal diffusion resistances range from 0.5 to 2.0 s/cm.

Because the herein described embodiment of a green canvas covered atmometer simulates closely the albedo and diffusion resistance of an alfalfa crop surface, an excellent correlation was found between atmometer evaporated water loss and alfalfa reference evapotranspiration. Table 1 sets forth the results of an experimental application of an atmometer according to the present invention.

TABLE 1

| Atmometer and Computed ETr (Modified Penman)[b] Comparison | | | |
|---|---|---|---|
| Period (Month/Day) | ATMometer Reading (cm) | Computed ETr (cm) | Ratio (ATM/ETr) |
| 6/18–6/22 | 2.87 | 3.12 | .92 |
| 6/22–6/25 | 1.07 | 1.04 | 1.02 |
| 6/25–7/2 | 4.27 | 4.50 | .95 |
| 7/2–7/6[a] | 2.39 | 2.87 | .83 |
| 7/23–7/30[a] | 3.02 | 3.38 | .89 |
| 8/10–8/13 | 1.02 | 1.09 | .93 |
| 8/13–8/20 | 3.30 | 3.63 | .91 |
| 8/20–8/27 | 2.54 | 2.85 | .89 |
| 8/27–9/4 | 4.57 | 4.80 | .95 |
| 9/4–9/10 | 3.30 | 3.66 | .90 |
| 9/10–9/17 | 2.06 | 2.34 | .88 Mean .92 |
| 9/17–9/24 | 3.66 | 3.94 | .93 SD .05 |

[a]Missing weather data from 7/6–7/23 and 7/30–8/10
[b]The modified Penman is an empirical equation used to compute alfalfa reference ET from solar, wind, humidity and temperature data.

The mean ratio of atmometer reading to computed alfalfa reference evapotranspiration was 0.92 with a standard deviation from this mean ratio of 0.05. This excellent correlation shows that the described atmometer accurately gives a direct estimate of reference evapotranspiration which is the evaporation (transpiration) from a green alfalfa crop well supplied with water and completely covering the ground surface at a crop height of at least one foot.

It is to be noted that a green non-fading canvas material was employed in order to simulate the diffusion resistance and albedo of alfalfa leaves; however, other colors may be employed in order to simulate other situations as described later.

The non-fading material is attached to the porcelain porous plate neck 22 via a string-tie, as shown in FIG. 2. A hole 36 is disposed in an upper portion of the reservoir bottle 24 so that the bottle 24 can be easily filled with water without disturbing the procelain plate attachment. A rubber stopper 38 is disposed in the hole 36 to provide a fluid tight seal.

A U-shaped supply tube 40 is connected at a first end to the rubber stopper 28 and at a second end to a clear sight glass 42. A vent hole is disposed at 43 in the underside of the U-shaped tube 40. The vent hole should be approximately one millimeter in diameter. Field tests have confirmed that any water vapor escaping out of the vent hole is negligible. The U-shaped tube 40 is connected to the sight glass 42 which has movable O-ring markers 44. The movable O-ring markers 44 are slidably mounted on the sight glass 42 for marking crop water use and irrigation time. Also note there is a top mark 45 on sight glass 42 for use as the point to which to refill the bottle.

Th top sliding O-ring can be used to keep track of water level with passage of time, while the bottom marker indicates the maximum amount of water allowed to evaporate before an irrigation in the Farmers Field is needed, i.e., irrigation time.

The cross-sectional area of the reservoir bottle 24 plus the sight glass 42 is equal to the evaporating surface area of the canvas covered atmometer. Because these two areas are equal, a depth of water evaporated from the porous porcelain plate 20 is the same depth of water used from the reservoir. The depth of water loss can be directly read from the sight glass 42 attached to the reservoir bottle 24.

Assuming the reservoir bottle has a cross-sectional area of 10 square inches and the porcelain plate has a cross-sectional area of 4 square inches, two inches of evaporation in the reservoir bottle would necessarily indicate 20 cubic inches of evaporated water (or 5 inches $\times$ 4 in 2 of plate area). For this example 5 inches of evaporation from the plate area gives 2 inches drop in the bottle or sight glass. But these changes in depth are to be the same so that the sight glass depth change equals depth evaporated which equals depth of crop water use i.e., 5 inches of crop ET. Thus, bottle and plate cross-section area must be equal.

Referring to FIG. 3, the supply tube 32 extends through the rubber stopper 28. The supply tube 32 can be made from copper, stainless steel, aluminum or plastic. A plastic check valve 46 is connected to the lower end of the supply tube 32 via a plastic tubing connector 48. The plastic check valve helps maintain the supply tube 32 and the procelain plate 20 filled with water. Further, the check valve prevents precipitation from entering the porcelain plate and supply bottle 24.

Both the tight weave of the canvas and the check valve prevent rain from entering the plate and going into the reservoir bottle. The "check valve" is a one way valve that allows water only to flow up the supply tube and not down.

The field location of the atmometer for accurate readings should be within a representative irrigated environment. To check the effect of atmometer height on weight loss, at atmometer was placed at a one meter height well into an irrigated alfalfa field alongside an atmometer whose evaporating surface was kept even with the top of the alfalfa canopy, which ranged from 25 cm to 75 cm. The water loss was nearly the same for the one month observation period. The atmometer at a one meter height evaporated 9.37 cm compared to 9.50 cm from the atmometer at crop height. Six readings were made during this period with the average difference between readings of the two atmometers being 0.04 cm. Any increased wind velocity or turbulence at the 1 meter height did not increase atmometer water loss. Since air resistance is usually the minor part of the resistance that water vapor encounters in diffusing from the leaf, any changing air resistance due to fluctuating wind velocities and turbulence at the one meter atmometer height would be buffered out by the larger diffusion resistance through the green covering. Water loss from the free water surface of evaporation pans is quite variable with wind speed because this buffering effect is not present.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains. For example, the non-fading cloth covering has been disclosed as having a green color; however, one skilled in the art will appreciate that other colors may be employed in order to model other situations such as crop coefficients for crops with incomplete green ground cover.

This invention of the green covered atmometer accurately estimates reference alfalfa evapotranspiration. All green crops have about the same albedo and diffusion resistance and therefore one shade of "alfalfa" green suffices. However, row crops (corn, beans, potatoes, etc.) do not always completely cover the ground surface as alfalfa reference crop does. To incorporate incomplete ground cover this invention also includes further partial shading or covering the green canvas with another layer(s) of brown canvas as the factor to represent partial crop shading of the soil surface in a farmer's field. In essence, this partial, variable brown covering is factoring in crop coefficients to the present embodiment of this atmometer invention.

What is claimed is:

1. A method of estimating crop consumptive water use comprising the steps of:
   providing a means for simulating the diffusion resistance and albedo characteristics of a crop;
   providing a continuous supply of liquid to said means for simulating;
   exposing said means for simulating in an outdoor environment;
   measuring an amount of evaporated liquid from said means for simulating; and
   determining an estimated crop evapotranspiration value by comparing said measured amount of evaporated liquid to a reference amount of evaporated liquid which is correlated with an actual crop evapotranspiration value.

2. The method of claim 1, wherein the step of providing comprises maintaining said simulated surface in a saturated condition.

3. The method of claim 1, wherein the step of imitating comprises providing a non-fading material having similar color as the crop and having similar diffusion resistance properties.

4. The method of claim 1, wherein the step of imitating comprises providing a green material having similar diffusion resistance properties as the crop.

5. The method of claim 1, wherein the step of exposing comprises maintaining said simulated surface at an elevated position.

6. The method of claim 5, wherein said elevated position is about at the top of the crop.

7. An apparatus for estimating an amount of crop consumptive water evapotranspiration comprising:
   (a) a liquid evaporating surface;
   (b) a covering means covering said evaporating surface for simulating the diffusion resistance and albedo characteristics of a crop; and
   (c) a supply means for providing a continuous liquid supply to said liquid evaporating surface.

8. The apparatus according to claim 7, wherein said covering comprises green canvas.

9. The apparatus according to claim 7, wherein said liquid evaporating surface is a porous porcelain Bellani plate.

10. The apparatus according to claim 7, wherein said supply means comprises:
    (a) a bottle having a filling neck for containing a reservoir of liquid;
    (b) a first pliant stopper means for providing a fluid tight seal at the filling neck of said bottle;
    (c) a second pliant stopper means for providing a fluid tight seal at a lower end of said liquid evaporating surface; and
    (d) a supply tube extending upwardly through said bottle and said first and second pliant stopper means into said porous liquid evaporating surface.

11. The apparatus according to claim 10, further comprising a check valve means disposed at a first end of said supply tube for preventing precipitation from entering evaporating surface and therefore supply bottle.

12. The apparatus according to claim 10, wherein said supply tube is comprised of a material selected from the group of copper, stainless steel, aluminum and plastic.

13. The apparatus according to claim 7, wherein said measuring means comprises:
    (a) a transparent sight glass; and
    (b) means for connecting said bottle and said sight glass.

14. The apparatus according to claim 13, wherein a total cross-sectional area of said sight glass and said bottle approximately equals a total evaporating surface area of said porous liquid evaporating surface.

15. The apparatus according to claim 13, further comprising markers slidably mounted on said sight glass and wherein graduated depth measurements are provided on said sight glass.

16. The apparatus according to claim 13, wherein said U-shaped supply tube is comprised at a material selected from the group of copper, stainless steel, aluminum, and plastic.

17. The apparatus according to claim 13, wherein a vent hole is provided on said U-shaped tube for allowing equalization of atmospheric pressure in the supply bottle.

18. The apparatus according to claim 17, wherein said vent hole is approximately 1 mm in diameter.

19. The apparatus according to claim 7, further comprising a measuring means for determining an amount of water evaporated from said covering means.

* * * * *